US012613845B1

(12) United States Patent
Powers

(10) Patent No.: US 12,613,845 B1
(45) Date of Patent: Apr. 28, 2026

(54) OBJECT ORIENTED VERSIONING AND MANAGEMENT SYSTEM USING EVENT STREAM ARCHITECTURE

(71) Applicant: Amazon Technologies, Inc., Seattle, WA (US)

(72) Inventor: Michael Louis Norman Powers, Leesburg, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/671,020

(22) Filed: May 22, 2024

(51) Int. Cl.
*G06F 16/21* (2019.01)
*G06F 16/2455* (2019.01)
*G06F 16/28* (2019.01)

(52) U.S. Cl.
CPC ...... *G06F 16/219* (2019.01); *G06F 16/24568* (2019.01); *G06F 16/282* (2019.01)

(58) Field of Classification Search
CPC . G06F 16/219; G06F 16/282; G06F 16/24568
See application file for complete search history.

(56) References Cited

U.S. PATENT DOCUMENTS

| | | | |
|---|---|---|---|
| 11,269,969 B1 * | 3/2022 | Moreau-Arnott ..... | G06F 40/258 |
| 2007/0130177 A1 * | 6/2007 | Schneider ........... | G06F 16/4393 |
| 2023/0325825 A1 * | 10/2023 | Mee ..................... | G06Q 20/389 |
| | | | 705/39 |

* cited by examiner

*Primary Examiner* — Loc Tran
(74) *Attorney, Agent, or Firm* — Eversheds Sutherland (US) LLP

(57) ABSTRACT

Systems, devices, and methods are provided for object oriented versioning and management. Techniques described herein may relate to determining a first event associated with a first binder, wherein the first event encodes a first set of elements, determine a second event associated with a second binder, wherein the second event encodes a second set of elements, and determine a version of a data object by at least: determining a hierarchal relationship between the first binder and the second binder, determining, based at least in part on the first event, a first state, determining, based at least in part on the first state and the second event, a second state, and generating the version of the data object according to the second state. A data object may be a file, object, document, etc.

19 Claims, 7 Drawing Sheets

400B

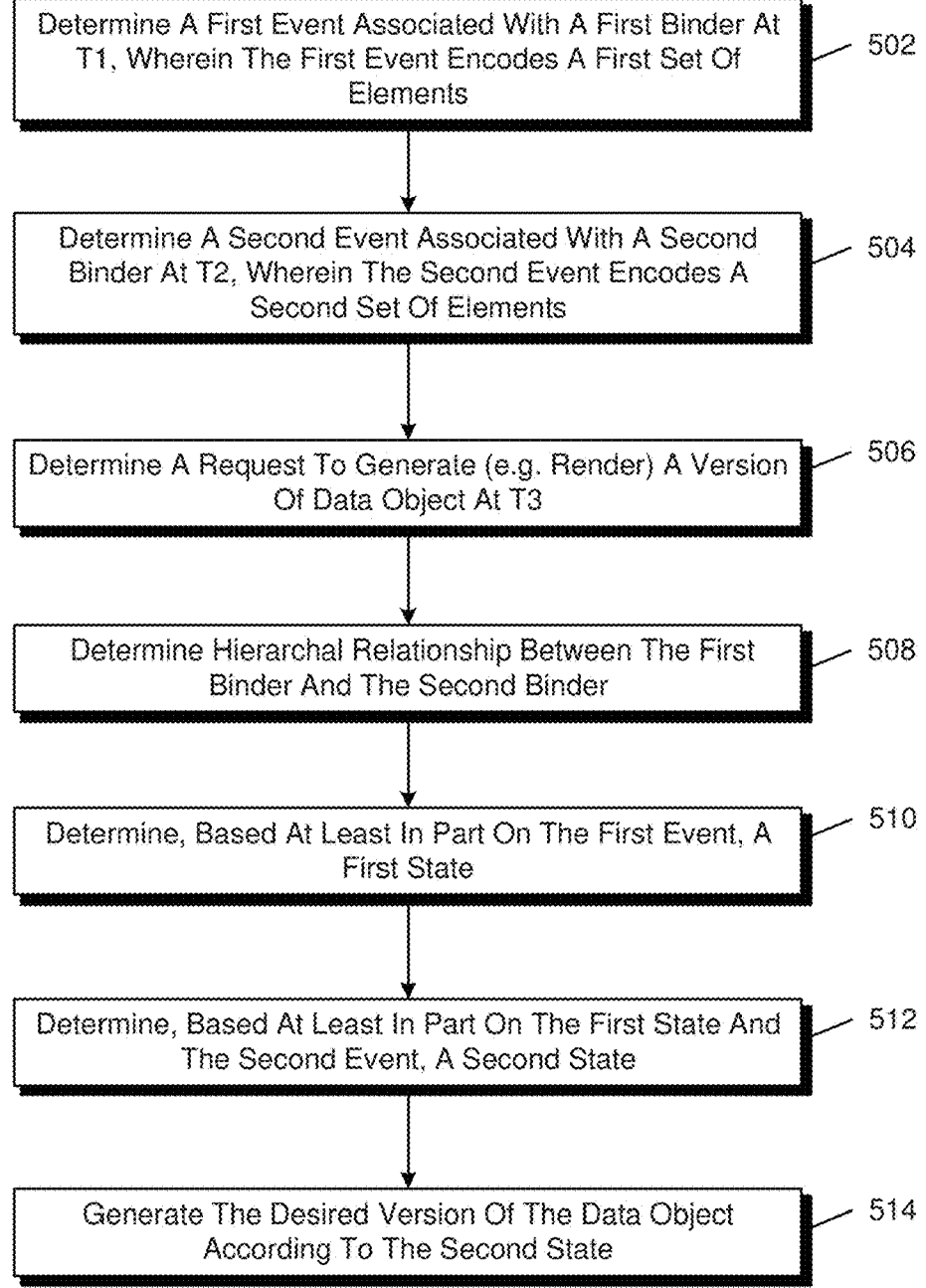

| | |
|---|---|
| Determine A First Event Associated With A First Binder At T1, Wherein The First Event Encodes A First Set Of Elements | 502 |
| Determine A Second Event Associated With A Second Binder At T2, Wherein The Second Event Encodes A Second Set Of Elements | 504 |
| Determine A Request To Generate (e.g. Render) A Version Of Data Object At T3 | 506 |
| Determine Hierarchal Relationship Between The First Binder And The Second Binder | 508 |
| Determine, Based At Least In Part On The First Event, A First State | 510 |
| Determine, Based At Least In Part On The First State And The Second Event, A Second State | 512 |
| Generate The Desired Version Of The Data Object According To The Second State | 514 |

FIG. 5

600

HARDWARE PROCESSOR — 602
INSTRUCTIONS — 624

MAIN MEMORY — 604
INSTRUCTIONS — 624

STATIC MEMORY — 606
INSTRUCTIONS — 624

SENSORS — 628

NETWORK INTERFACE — 620

ANTENNA(S) — 630

GRAPHICS DISPLAY DEVICE — 610

INPUT DEVICE — 612

UI NAVIGATION DEVICE — 614

STORAGE DEVICE — 616
MACHINE-READABLE MEDIUM — 622
INSTRUCTIONS — 624

SIGNAL GENERATION DEVICE — 618

OBJECT ORIENTED VERSIONING AND MANAGEMENT SUBSYSTEM — 636

POWER DEVICE — 632

OUTPUT CONTROLLER — 634

608

COMMUNICATIONS NETWORK — 626

FIG. 6

OBJECT ORIENTED VERSIONING AND MANAGEMENT SYSTEM USING EVENT STREAM ARCHITECTURE

BACKGROUND

Implementing a versioning and management system involves several technical challenges, particularly in managing different versioned data (e.g., files, objects, documents) over time. First, storing multiple versions of versioned data can quickly consume significant storage space. Second, version control requires some kind of metadata (e.g., timestamps, authors, change descriptions) to tracking data versions accurately. Additionally, quickly retrieving a specific version of data (e.g., file, object, document), especially from a large repository, can be difficult. Optimizing the system for fast access to both recent and historical versions is necessary for good performance. Additionally, when versioned data have dependencies, such as children or included components (e.g., images, tables), versioning becomes more complex. Changes in a parent may affect child and needs to be properly managed so that changes are propagated in a predictable and desired manner.

BRIEF DESCRIPTION OF THE DRAWINGS

FIG. 5 shows an illustrative example of a process 500 for dynamically generating versioned data (e.g., file, object, document), in accordance with one or more example embodiments of the present disclosure.

FIG. 6 illustrates a block diagram of an example machine 600 upon which any of one or more techniques (e.g., methods) may be performed, in accordance with one or more example embodiments of the present disclosure.

Figure 1:
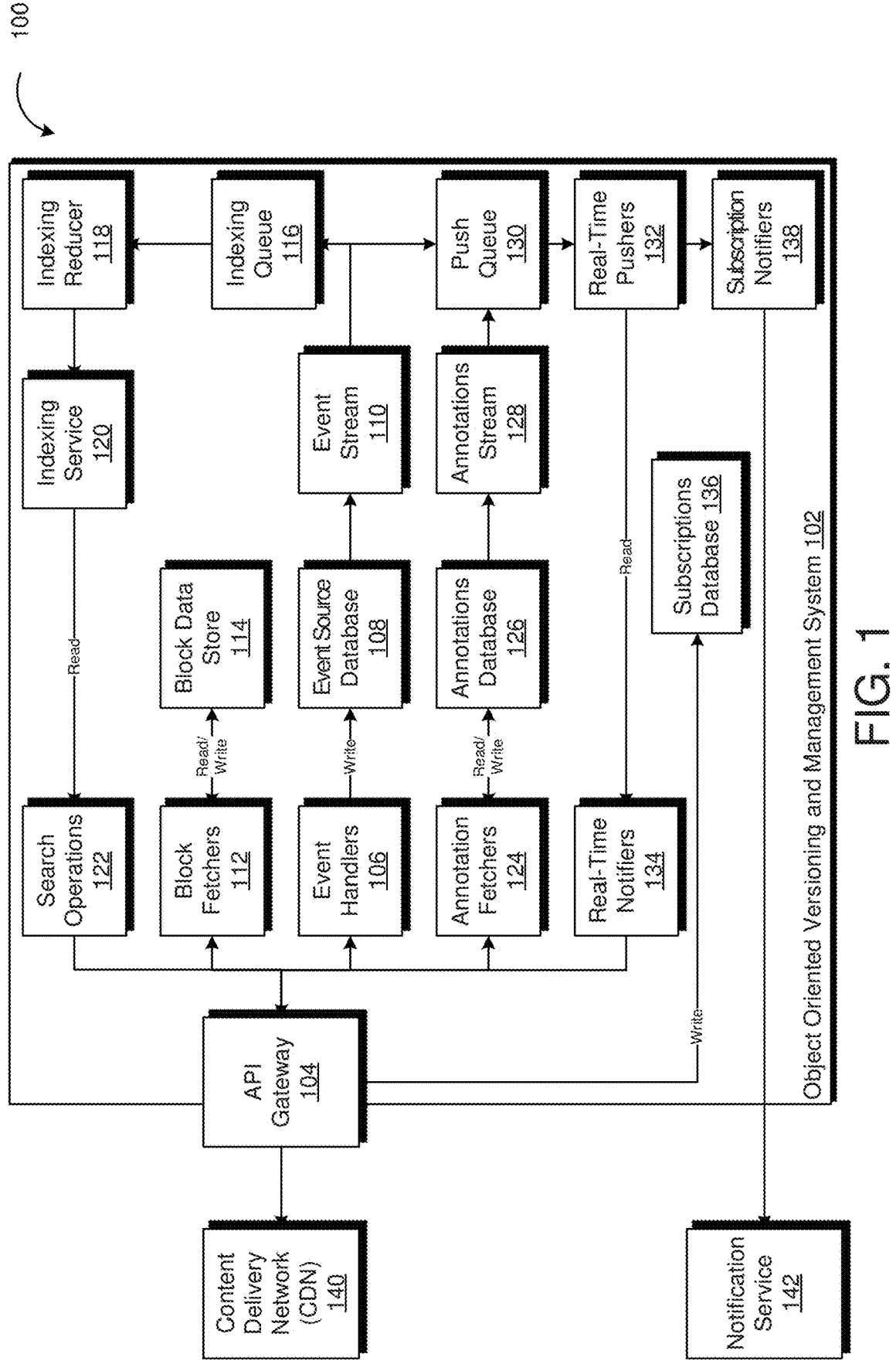
FIG. 1 illustrates a computing environment 100 in which a service-based architecture for an object oriented versioning and management system, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for implementing an object oriented versioning and management system using event stream architecture. Techniques described herein can be used to implement a multi-tenant service that provides a scalable service for data versioning and management. Data can exist in various forms—such as in the form of files, objects, documents, and the like—and techniques described herein can be utilized for authoring, managing, and rendering data according to a user's specific needs. In various embodiments, an event sourcing architecture is utilized for object oriented versioning and management. An immutable, append-only stream of updates is utilized to store templates and associated data as updates and for version control, according to at least one embodiment of the present disclosure. Various benefits that can be realized in connection with such an architecture include multi-region replication, efficient caching of immutable objects, real-time multi-user collaboration, and comprehensive auditing.

According to various embodiments, an object oriented versioning and management system described herein organizes data in a hierarchy. A hierarchy may be conceptualized in a tree-based format where child node(s) can inherent attributes from a parent node. The hierarchy can be implemented via a URI path hierarchy. For example, the hierarchal relationship can be implemented using objects and buckets, files and folders, and so on and so forth. In various embodiments, a child will automatically inherit templates, attributes, schema, and other elements from its parent.

Elements, as described herein, can refer to different concepts that are relevant to the implementation of an object oriented versioning and management system and utilized to dynamically generate, based on an event stream, files, objects, documents, and the like. In various embodiments, element types can include some or all of the following: binders; templates; attributes; schema; forms; and more. In some embodiments, a binder is implicitly implemented through a path hierarchy, as will be described in greater detail below, such as the disclosures below connected to FIG. 3.

In various embodiments, an event stream architecture is utilized to dynamically generate documents. Conventional version management systems will typically store various version of a document at rest. For example, when a document is uploaded with contents "Hello" it may be saved as a first version ver. 0.1 and when subsequently updated to contents "Hello World", a second version ver. 0.2 may be saved by the document management system. Conventional version management systems typically will save the original copy of a file (e.g., the ver. 0.1 file) and full copies of each commit (e.g., the ver. 0.2 file). In contrast, and in accordance with various embodiments that will be described in greater detail below, an object oriented versioning and management system of the present disclosure dynamically generates version controlled data (e.g., files, objects, documents) using an event stream. In various embodiments, an event stream architecture allows for streamed events for data (e.g., files, objects, documents) to be generate a version of such data as an immutable resource at any time. For example, the exact version of a document that existed at a particular point in time can be reconstructed from the event stream via reliance on an immutable stream of events.

According to at least one embodiment of the present disclosure, an object oriented versioning and management system uses an inheritance scheme and combines with other subsystems to realize version controlled data (e.g., files, objects, documents). In various embodiments, to implement questionnaire-driven contract generation from centrally-controlled templates, child documents are created under the template in the hierarchy that inherit content, key terms, and other elements from the parent. The versioning system of the object oriented versioning and management system allows for fine-grain control on whether and when changes to a parent are applied to a children, in accordance with at least one embodiment of the present disclosure. In various embodiments, the inheritance hierarchy can affect various aspects of data (e.g., files, objects, documents) such as allowing different divisions in an organization to have different stylesheets applied to the same contract document template. In various embodiments, the interactions described herein utilize a permission system to allow for fine-grained control over what data (e.g., files, objects, documents) a user can view or edit and whether they can accept and/or override inherited changes.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates a computing environment 100 in which a service-based architecture for an object oriented versioning and management system, in accordance with one or more example embodiments of the present disclosure.

According to at least one embodiment, computing environment 100 comprises an object oriented versioning and management system 102; API gateway 104; event handlers 106; event source database 108; event stream 110; block fetchers 112; block data store 114; indexing queue 116; indexing reducers 118; indexing service 120; search operations 122; annotation fetchers 124; annotations database 126; annotations stream 128; push queue 130; real-time pushers 132; real-time notifiers 134; subscriptions database 136; subscription notifiers 138; content delivery network (CDN 140); and notification service 142.

In various embodiments, object oriented versioning and management system 102 refers to a service that is implemented in the context of a computing resource service provider, such as a cloud service provider. In various embodiments, object oriented versioning and management system 102 generally provides various capabilities related to tracking changes and managing versions of data (e.g., files, objects, documents). An object oriented versioning and management system 102 can be utilized as a tool for drafting, editing, and reviewing documents (e.g., legal contracts) and help end-users by saving time and reducing the risk of misunderstandings or disputes by producing contracts that are consistent, enforceable, and in compliance with applicable laws and regulations.

Object oriented versioning and management system 102 can be utilized by various entities, such as parties (e.g., two or more) to a contract, admins that maintain various elements that can be used to generate such contracts, and more. Generally speaking, object oriented versioning and management system 102 is able to dynamically generate version controlled documents on demand, rather than saving each version of a document over time. This approach allows for object oriented versioning and management system 102 to scale over time and saves long-term storage space as more and more versions are created. In various embodiments, object oriented versioning and management system 102 is an immutable version control system—for example, changes to versioned data (e.g., files, objects, documents) is encoded as events of an event stream that is append-only and cannot be subsequently removed from the event stream. In various embodiments, object oriented versioning and management system 102 comprises some or all of the following components: API gateway 104; event handlers 106; event source database 108; event stream 110; block fetchers 112; block data store 114; indexing queue 116; indexing reducers 118; indexing service 120; search operations 122; annotation fetchers 124; annotations database 126; annotations stream 128; push queue 130; real-time pushers 132; real-time notifiers 134; subscriptions database 136; and subscription notifiers 138.

In various embodiments, an application programming interface (API) gateway 104 is a component of a service or system, such as object oriented versioning and management system 102 depicted in FIG. 1. API gateway 104 may be implemented as hardware, software, or a combination thereof. For instance, API gateway 104 can be implemented by one or more machines described in connection with FIG. 6. In various embodiments, API gateway 104 acts as an intermediary between client computing systems and back-end services, providing a centralized entry point for accessing APIs supported by object oriented versioning and management system 102. API gateway 104 can implement various functionality, such as streamlined API management, enhance security, and improve scalability. In various embodiments, API gateway 104 serves as a single entry point for accessing multiple APIs hosted on various backend services. It simplifies API consumption by consolidating endpoints and providing a unified interface for clients to interact with different services. In various embodiments, various systems and services of object oriented versioning and management system 102 are fronted by API gateway 104 with private endpoints exposed internally to a secure CDN (e.g., CDN 140) that makes the endpoints available to authorized external clients. In various embodiments, CDN 140 is configured to cache outputs or simply allow pass-through without caching. API gateway 104 can be utilized to implement various security and access control capabilities, such as the enforcement of security measures and access control policies for APIs. In various embodiments, API gateway 104 performs authorization and/or authentication of clients, validates API requests, enforces authorization policies to ensure that only authorized users or applications can access protected resources, and so on and so forth.

In various embodiments, event handlers 106 are implemented using an event-driven platform. For instance, an event-driven platform can be implemented as an event-driven compute service in the context of a cloud service provider. In various embodiments, event-driven platforms are implemented using an event-driven architecture. Invocation of various API endpoints of object oriented versioning and management system 102 can trigger the execution of various handlers. For instance, when a client (e.g., end-user) performs an action to create a file, modify a document, delete an object, etc., an event handler is invoked, according to at least one embodiment. Events can be emitted and handled in response to certain types of activities, such as CRUD (create/read/update/delete) operations. When a specific event such as a web API request to perform a CRUD operation occurs, the event-driven platform may be notified (e.g., by the authentication service) of that event and the event-driven platform. The event-drive platform may determine how to handle the event, which may be handled in part by custom code or logic that is selected based on information obtained about the request—for example, the custom logic may differ for security policies based on the type of resource that the security policy applies to. In some embodiments, the event-drive platform may subscribe to notification messages from the authentication service for events and the authentication service may invoke callback function (such as a lambda expression) in response to an event that the event-drive platform subscribes to receive notifications for.

The event-driven platform may receive the events and determine, either internally (e.g., using a component of the event-driven platform) or externally (e.g., by delegating to another service) how to handle the events. As an example, the event-driven platform may include rules regarding which, among a list of custom logics, should be invoked based on the specific type security policy that is being applied or other metadata associated with the security policy being applied. A mapping of security policy types to custom logics may exist. For example, a first custom logic may be invoked based on the security policy applying to a computing resource having a first service namespace and a second custom logic may be invoked based on the security policy applying to a computing resource having a second service namespace.

In various embodiments, event handlers 106 is invoked by an event-drive platform when certain types of events occur. These events may include, for example, CRUD operations. In various embodiments, an event source is a stream of updates made by the users. Event handlers 106 may be utilized to persist events in an event source database 108. In various embodiments, an event store persists events that represent state changes. In various embodiments, event source database 108 refers to a database or any other suitable data storage system for storing event information. For instance, event source database 108 is implemented as a NoSQL database, according to at least one embodiment of the present disclosure. In various embodiments, each source is its own partition, each with may sparse events, such that a large number of events can fit onto a single page of query results. Full pages may be cached immutably and indefinitely and ordered by time as a range key. In various embodiments, API callers can request the current event source and receive live or near-live updates, or request a flattened material view of the state of the source as it currently exists, or at any point in time from the past.

In various embodiments, event stream 110 refers to an immutable stream of events. In various embodiments, event stream 110 refers to a real-time data stream that is provided by a data streaming service. A data stream may comprise a collection of data records that are continually and sequentially added to over time. For example, a type of data stream is an event stream 110, and a type of data record is an event. In various embodiments, a real-time data streaming service enables users to capture, process, and store data streams at scale, with high security and durability. In various embodiments, an event stream can handle an amount of data that is proportional to the number of shards. A shard may refer to a unit of capacity within a stream. Each record in a stream may have a sequence number, a partition key, and a data blob. The sequence number refers to a unique identifier for a record within a shard, while a partition key refers to a key used to determine which shard a record belongs to, and a data blob refers to the actual data payload. In various embodiments, event stream 110 is append only and past events are immutable. In various embodiments, versioned data (e.g., file, object, document) can be rendered as it existed at any point in time, including the present, by running a reducer (e.g., indexing reducers 118) on the stream up to a chosen point in time. In various embodiments, event stream 110 can be forked to create new sources that share the same past event stream (e.g., templates can be implemented this way).

In various embodiments, a block service comprises block fetchers 112 and block data store 114. A block may refer to an immutable string of text (e.g., encoded in UTF-8). IN various embodiments, object oriented versioning and management system 102 is responsible for storing large amounts of text content, such as storing tenant document templates. Templates (e.g., for documents) can be partitioned into discrete blocks separated by newlines. Excluding handling of white space and other edge cases, blocks typically correspond to paragraphs. In various contexts, paragraphs are mapped to sections of a document—for example, in contract authoring, paragraphs typically correspond to contract clauses. In various embodiments, a block comprises an immutable string of text. In various embodiments, a block is represented by a hash of the block's contents. For example, a MD5 hash of the first 16 characters of a block can be used to represent the block. Blocks may be stored in block data store 114 (e.g., implemented as a NoSQL database).

In various embodiments, block fetchers 112 are implemented using an event-drive platform, such as an event-driven compute service of a cloud service provider. Block fetchers 112 may be used to read data from and/or write data to block data store 114. In various embodiments, when a client of object oriented versioning and management system 102 (e.g., end-user) creates content via an API endpoint of API gateway 104, a block is created. In various embodiments, a block comprises an immutable string of text. Blocks are persisted in block data store 114 and can be cached in CDN 140 or at the client, as needed, in various embodiments, such as where there is frequently accessed templates that would benefit from the faster load times of a cache. Even for document drafts undergoing heavy edits, many blocks will typically remain unchanged, and most portions of a document can remain cached for quick retrieval. In various embodiments, duplicate portions of text within a document or across documents could resolve to the same hash and optimizations can be made so that they are persisted only once in a data storage system for storage savings and cached under one key for additional document retrieval performance and longer life in caches. In various embodiments, customers have access to a clause library where users can conduct full text searches for clauses and request recommendations for clauses based on similarity. Metrics such as age, usage, complexity, and history can be calculated on a per-block, which necessitates tracking blocks independently from the templates that refer to them. Tracking blocks independently allows attaching annotations to support use cases such as tagging, approval, and comments which can be attached to a block in a template or attached to a block to be shown in all templates that include it (e.g., to support use cases such as displaying deal guidance on how to use a particular clause).

In various embodiments, block data store 114 is implemented as a data storage system, such as a NoSQL database, for storing blocks. In various embodiments, block data store 114 is implemented as a key-value store for large immutable objects that are expected to be cached. In some embodiments, a data storage service will store blocks as objects of varying sizes and can be migrated to cold storage for infrequently used objects.

In various embodiments, indexing reducers 118 refers to a component that is capable of computing a result using a stream (e.g., event stream 110). In various embodiments, indexing reducers 118 is utilized to render versioned data (e.g., file, object, document) as it existed at a certain point in time. According to at least one embodiment of the present disclosure, indexing reducers 118 can be used to determine a point in time (e.g., user-specified point in time) and render a version of data (e.g., file, object, document) as it existed at that point in time by identifying a snapshot at a second point in time that precedes the desired point in time and relying the event stream from the second point in time to the desired point in time and applying the events in sequence. In various embodiments, the second point in time referred to above is the first version of the versioned data (e.g., file, object, document). In various embodiments, indexing reducers 118 comprises an event-driven function that is triggered in response to each data stream of object oriented versioning and management system 102—that is, event stream 110 and annotations stream 128. Each reducer is responsible for materializing a view of the object to be indexed.

In various embodiments, indexing service 120 is a search service that provides support for full text search over various elements that are managed by object oriented versioning and management system 102. The search operations 122 supported by indexing service 120 may include the ability to search over binders, template, annotations, or combinations thereof. In various embodiments, indexing service 120 serves as a repository for versioned materialized views of binders and templates.

In various embodiments, an annotation service comprises annotations database 126 and/or annotations stream 128. Annotations can be used to support tagging, commenting, approvals, and integration with other approval systems that may interact with object oriented versioning and management system 102. In the context of object oriented versioning and management system 102, an annotation can refer to an immutable run of text associated with an opaque external entity identifier, an optional secondary entity identifier, an arbitrary type, an author alias, a timestamp, and optional user-defined attributes. In various embodiments, tags are a kind of annotation, each of which is limited to a short text string. Users can tag some entities, such as templates, with tags for categorization and search index lookup, or other related functionality.

In various embodiments, annotation services are exposed to customers via API gateway 104. API endpoints for annotations (e.g., tagging, commenting, approvals) can be accessed via API gateway 104 to invoke annotation fetchers 124. In various embodiments, annotations are stored in annotations database 128 which provides the basis for an annotations stream 128, which may be considered a data stream similar to event stream 110 described above. In various embodiments, annotations stream 128 is provided to push queue 130. Users can tag some entities, such as templates, with tags for categorization and search index lookup, or other related functionality, which are handled by indexing reducers 118 and/or indexing service to index annotations and provide search-related capabilities.

In various embodiments, push queue 130 is implemented as a simple queue, for instance, by a message queuing service. Records from data streams (e.g., event stream 110 and/or annotations stream 128) can be provided to push queue 130 wherein messages encoding such records are broadcasted. In various embodiments, messages are sent to real-time pushers 132 which can be read by real-time notifiers 134 and/or subscription notifiers 138. In various embodiments, real-time notifiers can then be routed to other internal subsystems of object oriented versioning and management system 102 and used for various purposes, such as the update cached information, the current view on a multi-party collaboration document, and so on and so forth. In various embodiments, subscribers to real-time events are recorded to subscriptions database 136. In various embodiments, subscription notifiers 138 provides messages from push queue 130 to customers that subscribe for topics that match the records being emitted. For example, an external client can receive, from notification service 142, a notification when a new version of data (e.g., file, object, document) is available, such as when a customer or counterparty fills a form.

In various embodiments, a content delivery network (e.g., CDN 140) interacts with object oriented versioning and management system 102. In various embodiments a client (e.g., customer or end-user computing entity) accesses capabilities of object oriented versioning and management system 102 via CDN 140. In various embodiments, CDN 140 uses encryption communications channels such as HTTPS or TLS to ensure that data transmitted between the origin server, CDN edge servers, and end-users is encrypted, preventing unauthorized access or tampering. CDN 140 can be utilized as an access control mechanisms to restrict access to content based on various criteria such as IP addresses, geographical locations, or using signed URLs/cookies, ensuring only authorized users can access the content.

Figure 2:
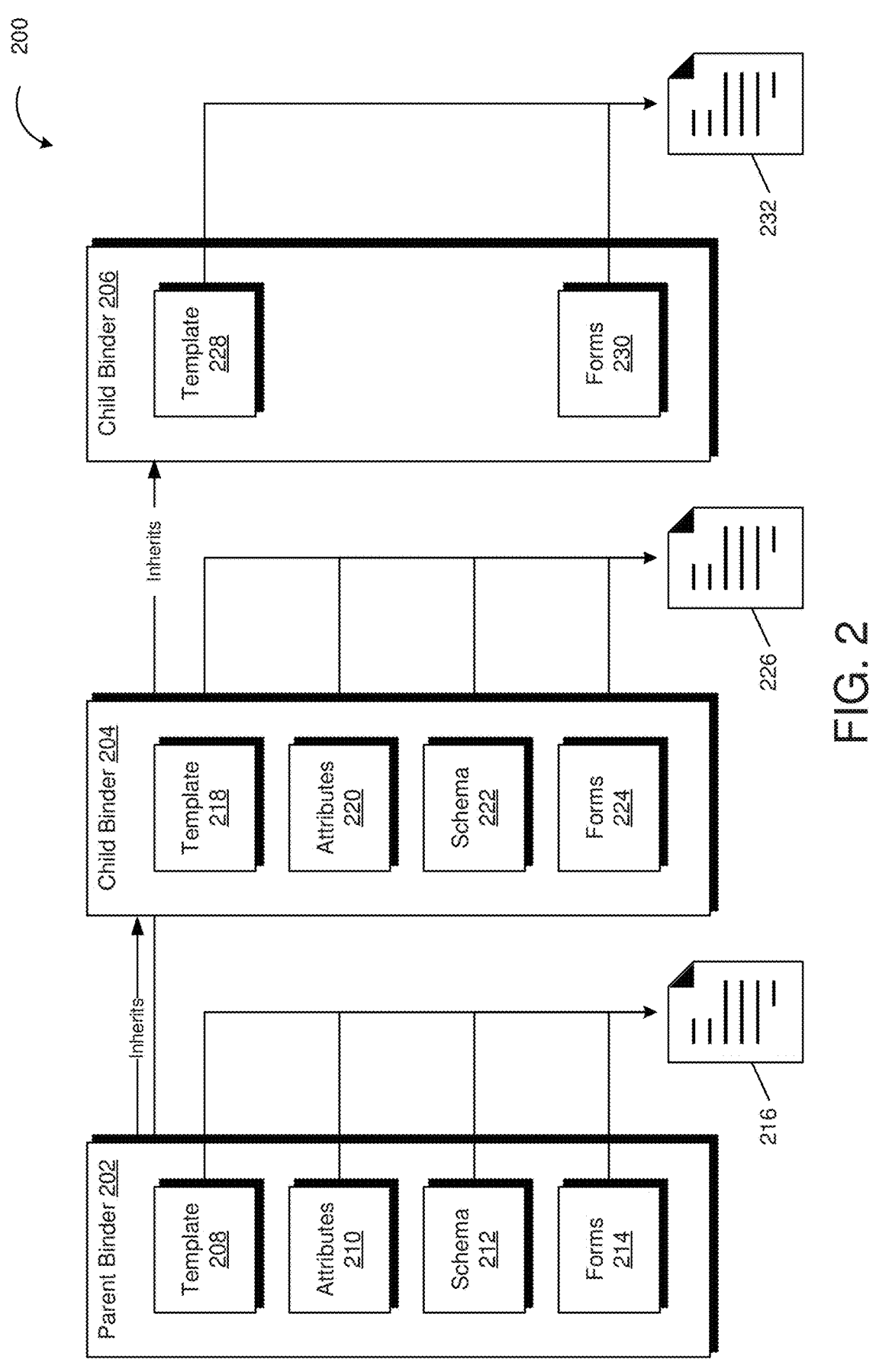
FIG. 2 illustrates a computing environment 200 in which data (e.g., file, object, document) is dynamically generated from a set of elements, in accordance with one or more example embodiments of the present disclosure.

FIG. 2 illustrates a computing environment 200 in which data (e.g., file, object, document) is dynamically generated from a set of elements, in accordance with one or more example embodiments of the present disclosure.

According to at least one embodiment, computing environment 200 comprises: parent binder 202; first child binder 204; and second child binder 206. Further, various elements may be associated with parent binder 202, such as template 208; attributes 210; schema 212; and forms 214. These elements can be used to derive document 216. Child binder 204 may inherit various elements from parent binder 202 and furthermore other elements may be associated with child binder 204, such as template 218; attributes 220; schema 222; and forms 224. These elements can be used to derive document 226. Child binder 206 may inherit various elements from 202 and may have its own elements, depicted as template 228 and forms 230. These elements can be used to derive document 232. In various embodiments, a document is generated from a binder given a template and a set of attributes. Templates-such as those depicted in FIG. 2, include plain text with embedded markup to support formatting, placeholder substitution, and spans that are conditionally included or repeating.

In various embodiments, FIG. 2 is implemented in the context of an object oriented versioning and management system, which may be a service provided by a computing resource service provider to clients. Data (e.g., files, objects, documents) that are versioned and managed by object oriented versioning and management system may be represented by a set of elements, rather than being stored as a monolithic file. For example, a traditional file management system might store a document as a single "*.DOC" or "*.DOCX" file. In contrast, a document in object oriented versioning and management system is represented by a set of elements, and rendered based on its constituent parts. For example, document 216 is rendered by parsing and reducing template 208, attributes 210, schema 212, and forms 214. In various embodiments, there are multiple versions of an element, which can be resolved by replaying the events of an event stream.

In various embodiments, a template refers to an ordered list comprising a string of literal text or a reference to another template (e.g., via a template identifier). A template may comprise strings of plain text with markup instructions for use when rendering or generating a document or questionnaire. In various embodiments, Markdown is used as the template's formatting syntax for readability, and supports Javascript template literals. For example, the following is an acceptable template:

This Test (the "Test") is a test of a signature block that demonstrates:

1. conditional expressions and
2. multiple nested template literals that preserve newlines and spacing.

In this case, for the signature block to appear either first name and last name must be specified.

```
<hr>
*Signed:*
$ {firstName} $ {lastName}
$ {signatureDate}
```

What a user sees as a template is text content divided into sections, where each section is persisted as a separate template to allow sharing of common content.

In various embodiments, attributes represent metadata or key terms relevant to the current state of data (e.g., file, object, document) and which can be combined with templates to generate documents. Attributes may sometimes be referred to as "values." As an example, an acceptable set of attributes is as follows:

```
{
    "firstName": "John",
    "lastName": "Doe",
    "signatureDate": "2024 May 13"
}
```

In various embodiments, a schema is an optional set of rules that map attribute names to data types and additional validation rules that can be used by UI editor components. Schema may sometimes be referred to as "fields." A schema may be considered the metadata that describes the characteristics and constraints of the attributes associated with a binder and shared across templates so that the data (e.g., file, object, document) generated from the binder are consistent with each other. For instance, a schema may enforce that a "signatureDate" attribute is in an acceptable date format, such as an ISO 8601 compliant format, a YYYY-MM-DD format, or other acceptable time/date formats. For instance, the following is an acceptable schema that imposes conditions on various attributes:

```
{
    "firstName": {
        "name": "First Name",
        "description": "or Preferred Name",
        "conditions": {
            "!middleName || firstName": "First name is required when middle
            name is present",
            "!firstName || firstName.length >=Math.PI": "If specified, first
            name must be at least n characters long",
            "firstName.length<20": "First name must be under twenty
            characters in length"
        }
    },
    "middleName": {
        "name": "Middle Name",
        "description": "Optional",
```

-continued

```
        "conditions": { }
    },
    "lastName": {
        "name": "Last Name",
        "description": "Last name or surname required",
        "conditions": {
            "lastName": "Last name must be specified",
            "lastName.length >= Math.PI": "If specified, last name must be at
            least n characters long",
            "lastName.length < 20": "Last name must be under twenty
            characters in length"
        }
    },
    "signatureDate": {
        "type": "date",
        "name": "Signature Date"
    }
}
```

In various embodiments, a form is implemented as a web-based form that is generated from a template and allows a user to modify the attributes associated with a template's binder. Depending on the contents, a template can be used to render a questionnaire, a document, or both.

In various embodiments, a binder is a foundational entity that "binds" together a set of templates with a set of attributes to use when rendering those templates into documents. In various embodiments, a binder is implemented as a hierarchy with the ability to share common metadata, attributes, and permissions between documents in the same folder. In various embodiments, bindings are implicitly made through a URI path length that encodes both the parent and child folders, which allows for direct inheritance of a parent's elements (e.g., template, attributes, metadata). A binding can be implicitly determined through a folder-based hierarchy, for example, by having child elements stored within a folder or directory of a parent, thereby indicating the inheritance hierarchy through the folder path or directory path.

In various embodiments, data (e.g., file, object, document) is dynamically rendered through its constituent elements. For example, document 216 depicted in FIG. 2 is rendered by obtaining template 208, attributes 210, schema 212, forms 214, and rendered. Template 208 may contain references which are resolved by consulting attributes 210. For example, template 208 may include a reference to a name attribute and the value for the name attribute is included in attributes 210. In some embodiments, a schema 212 encodes an optional set of rules that maps attribute names to data types and additional validation rules. In some embodiments, forms are generated in a web-based form that allows the user to modify the attributes associated with the template's binder. For example, a contract document may include fields for a counterparty to sign, which can be provided via forms 214.

In various embodiments, inheritance is utilized to dynamically render data (e.g., file, object, document) based on its bindings. For example, child binder 204 inherits various elements from parent binder 202. Child binder 204 may inherit, based on its bindings, template 208, attribute 210, schema 212, and forms 214 from parent binder 202. In various embodiments, child binder 204 is able to override some or all of the parent elements. For example, template 218, attributes 220, schema 222, and forms 224 of child binder 204 can partially or entirely override template 208, attributes 210, schema 212, and/or forms 214 of parent binder 202.

In various embodiments, child binder 206 inherits various elements of parent binder 202 via its bindings. For example, child binder 206 is depicted as having template 228 and forms 230 that partially or entirely override the default behavior defined by parent binder 202. Child binder 206, as depicted in FIG. 2, does not have additional attributes or schema, meaning that attributes 210 and schema 212 of parent binder 202 are directly and fully inherited by child binder 206.

Figure 3:
FIG. 3 illustrates a computing environment 300 in which hierarchal binders are implemented, in accordance with one or more example embodiments of the present disclosure.
Figure 3:
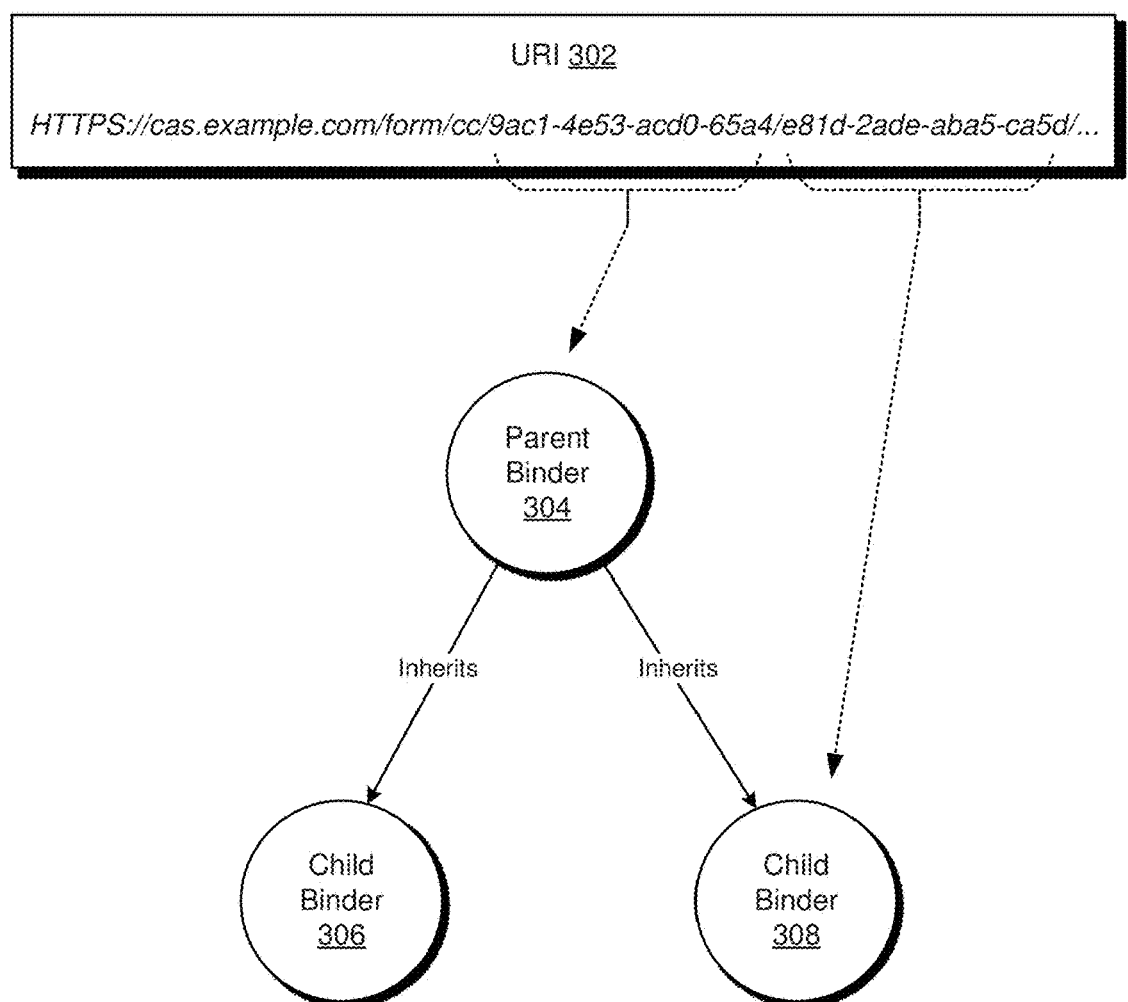

FIG. 3 illustrates a computing environment 300 in which hierarchal binders are implemented, in accordance with one or more example embodiments of the present disclosure.

According to at least one embodiment, computing environment 300 comprises: an identifier (e.g., URI 302); parent binder 304; child binder 306; and child binder 308. FIG. 3 depicts a parent-child relationship and the encoding of such a relationship in URI 302.

In various embodiments, a binder is a data structure that associates a set of elements that are used to render a version of data (e.g., file, object, document). For example, a universal resource identifier (URI) may be as depicted in FIG. 3. Continuing with this example, binder information may be encoded within URI 302 depicted in FIG. 3. URI 302 may be represented as the following path: "HTTPS://cas.example.com/form/cc/9ac1-4c53-acd0-65a4/e81d-2ade-aba5-ca5d/ . . . " and encodes a hierarchal binder relationship. In at least one embodiment, the path hierarchy determines the binder hierarchy. In FIG. 3, "9ac1-4c53-acd0-65a4" is associated with parent binder 304. This path information can be used for various purposes. One purpose may be to access templates, attributes, and other element data or metadata for rendering a document at the parent level. Another purpose may be to access templates, attributes, and other element data or metadata for inheritance by child binders, such as child binder 306 and child binder 308. Another purpose may be to access child binders, such as child binder 306 and child binder 308, which may have element data stored in a sub-folder or sub-directory from the parent's location.

A hierarchal relationship between binders is depicted in FIG. 3. For example, both child binder 306 and child binder 308 may be accessible from sub-folders or sub-directories under the parent binder's path. In various embodiments, a child binder is able to access element data from a parent binder to inherit templates, attributes, and other elements of a document from the parent. A child binder may have the ability to override some or all of the elements of a parent. For example, at the location child binder 308 "e81d-2ade-aba5-ca5d" that is underneath "9ac1-4e53-acd0-65a4" there may be additional element data for attributes, templates, etc. that override such element data of parent binder 304.

Figure 4A:
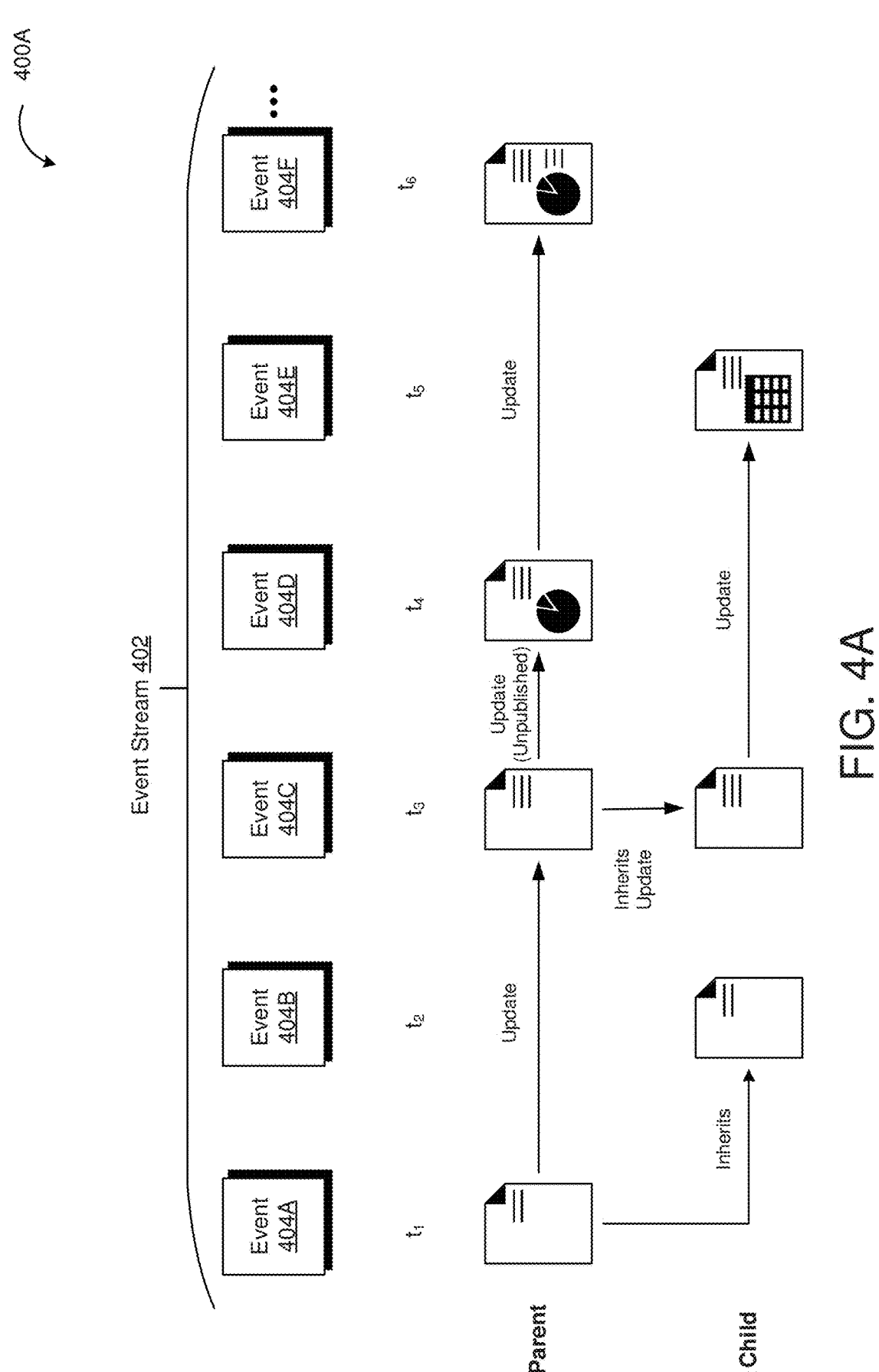
FIG. 4A illustrates a computing environment 400A in which an event stream and hierarchal bindings are used to version control data (e.g., file, object, document), in accordance with one or more example embodiments of the present disclosure.

FIG. 4A illustrates a computing environment 400A in which an event stream and hierarchal bindings are used to version control data (e.g., file, object, document), in accordance with one or more example embodiments of the present disclosure.

According to at least one embodiment, computing environment 400 comprises: an event stream 402 and events 404A-404F in connection with a parent and child that are linked together by hierarchal bindings.

In various embodiments, event stream 402 refers to a real-time data streaming service enables users to capture, process, and store data streams at scale, with high security and durability. In various embodiments, an event stream can handle an amount of data that is proportional to the number of shards. A shard may refer to a unit of capacity within a stream. Each record in a stream may have a sequence number, a partition key, and a data blob. The sequence number refers to a unique identifier for a record within a shard, while a partition key refers to a key used to determine which shard a record belongs to, and a data blob refers to the actual data payload.

In various embodiments, event stream 402 comprises a plurality of events, such as events 404A-404F, as depicted in FIG. 4A. Each event represents a state change of data (e.g., file, object, document) that is managed by an object oriented versioning and management system, such as those described in connection with FIG. 1. For example, FIG. 4A depicts a hypothetical example in which a parent document is created at time t1, a child document is created at time t2, the parent document is modified at time t3 and triggers an inherited update in the child document, the parent document is modified at time t4, the child document is modified at time t5, and the parent document is modified at time t6.

FIG. 4A depicts an example computing environment 400A in which various events of the event stream 402 can be utilized to render versioned data (e.g., documents) at various points in time. In a hypothetical example, event 404A at time t1 refers to an event in which a document is created. A document may be composed of various elements, such as templates, attributes, forms, and so on and so forth. At a later point in time—referred to as time t2—a child document may be created, for example, by an admin of an organization that manages various contract documents. A binding may be used to bind various elements of the parent document to the child document—for example, a child document may initially inherit all or some of the elements of the parent document.

In various embodiments, changes to a parent document can be inherited by its children. As a hypothetical example, a clause in the parent document depicted in FIG. 3 may be updated at a point in time t3, and the changes in event 404C can be automatically inherited by the child document. In some embodiments, updates can be unpublished, such that the changes that are made at time t4 in event 404D are not automatically inherited by its children. In some embodiments, a publish event is a discrete event of the event stream and indicates that changes prior to the publish event should be applied to children. For example, an admin may make various drafts or changes to a parent document before publishing it for use by the children.

Returning to FIG. 4A, event 404E depicts a change or update that is made to the child document that occurs at time t5. At a later point in time—time t6—a change may be made to the parent in event 404F. This may result in a scenario in which there is a conflict between the parent and the child. For example, if the child document has a table inserted at a part of a document at time t5 and the parent later inserts a graph at the same part of the document at a later time t6, the changes made to the child document may supersede the changes to the parent document.

Figure 4B:
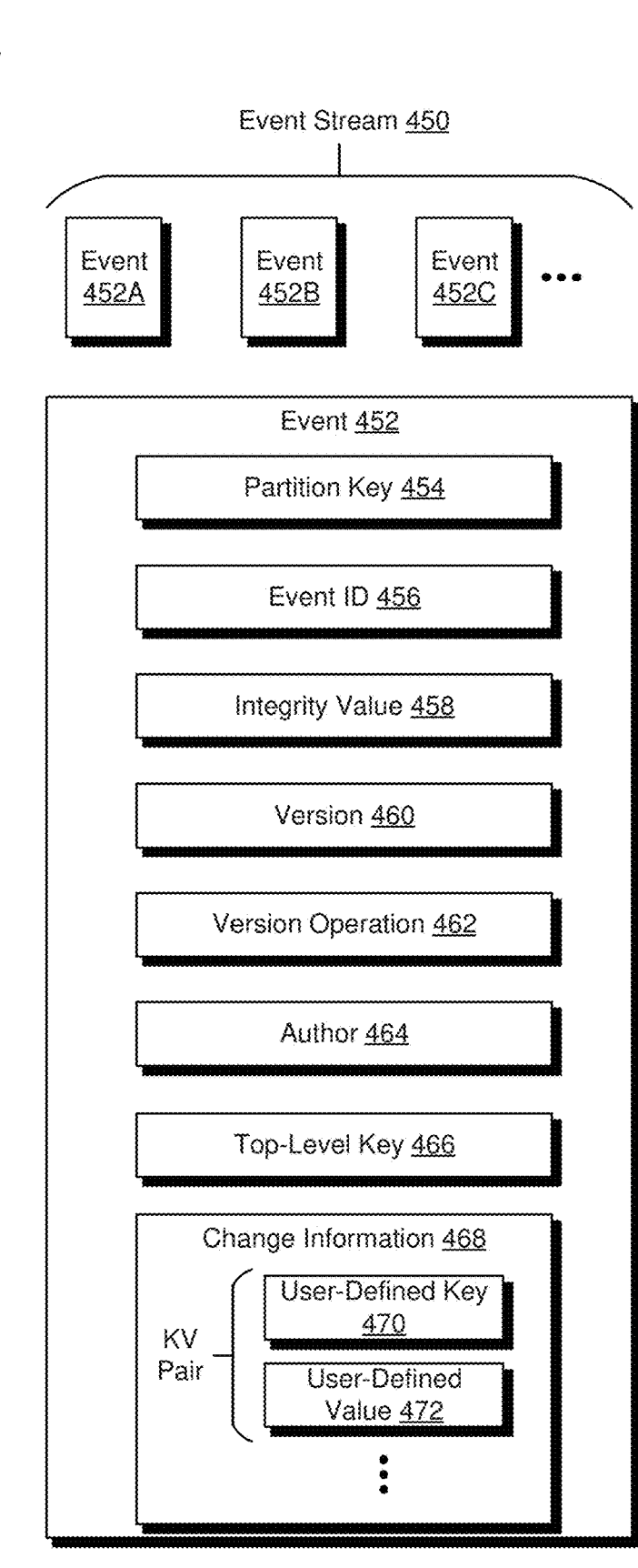
FIG. 4B illustrates a diagram 400B that depicts a representation of an event, in accordance with one or more example embodiments of the present disclosure.

FIG. 4B illustrates a diagram 400B that depicts a representation of an event, in accordance with one or more example embodiments of the present disclosure.

According to at least one embodiment, computing environment 400B comprises: an event stream 450 comprising events 452A-452C. FIG. 4B further depicts event 452, which may be an event of event stream 450.

In various embodiments, event stream 450 refers to a real-time data streaming service enables users to capture, process, and store data streams at scale, with high security and durability. In various embodiments, an event stream can handle an amount of data that is proportional to the number of shards. A shard may refer to a unit of capacity within a stream. Each record in a stream may have a sequence number, a partition key, and a data blob. The sequence number refers to a unique identifier for a record within a shard, while a partition key refers to a key used to determine which shard a record belongs to, and a data blob refers to the actual data payload.

An event stream 450 may comprise a temporally ordered sequence of events, such as event 452A, event 452B, event 452C, and so on and so forth. In various embodiments, event 452 is illustrative of an example event that can be part of event stream 450. In various embodiments, event 452 comprises: partition key 454; event ID 456; integrity value 458; version 460; version operation 462; author 464; top-level key 466; and change information 468. In various embodiment, change information comprises one or more key-value pairs such as the key value pair depicted in FIG. 4B of user-defined key 470 and user-defined value 472. In various embodiments, events are encoded in a JSON format, or other suitable format that is human-readable.

In various embodiments, a partition key 454 refers to the partition that holds all events for the event source that is identified. For example, the partition key may be in the form of {tenant}/{type}/{id} where the id is opaque. An example of a partition key 454 is:

_pk: "binder/cc/org/1234/bg/6789/dataobject/abcdef"

In various embodiments, event ID 456 refers to an ISO server timestamp concatenated with a hash of the event contents, omitting the event ID. In various embodiments, the timestamps of each event have the same digits of decimal precision to ensure deterministic sorting and ordering of events. An example of event ID 456 is:

_sk: "2024-05-13T12:05:34.123Z3801534bc4820e4d"

In various embodiments, integrity value 458 refers to the last known event at the time that the present event (event 452) was created. Integrity value 458 may be utilized to ensure the integrity as each event's hash contains the previous event ID and may be used to implement optimistic locking strategies. An example of integrity value 458 is:

_psk: "2024-05-12T12:13:51.321Z95eaa923700023el"

In various embodiments, version 460 refers to the version of the event source schema to which the event conforms. In various embodiments, the version will be updated when breaking changes are applied that would require a new reducer. An example of version 460 is:

_v: "0"

In various embodiments, version operation 462 is used to signify major versions or delete tombstones. In various embodiments, version operations create an entry in a versions field with a key equal to the value for the attribute and the value equal to the event ID. Some events can be used to signify a published version. For example, where _op="V" may signify a published version. For these events, this value is an application-defined version identifier as a string (e.g., "1.0.3" or "alpha" or "draft"). In various embodiments, at this point, a materialized view is retained as an optimization to save work on future runs of the reducer. In some embodiments, a reducer can create a system-generated publish event to force the creation of a checkpoint when it encounters a number of events that exceeds a predetermined threshold (e.g., n=100 events). An example of a version operation is:

_op?: "V"

In various embodiments, author 464 refers to the user or principal responsible for an update. In some embodiments, author 464 is encoded as an email address or other identifier that can be used to sufficiently disambiguate the author of the event. An example of author 464 is:

SampleUser@Example.com

In various embodiments, top-level key 468 refers to a user-defined top level key that specifies what was modified. For example, when binders are changed, it can be "schema", "templates", or "attributes" and for version operations, the value can be the application-defined version identifier as a string—e.g., "1.0.3" or "alpha" or "draft" or others. An example of top-level key 468 is:

_evt?: "attributes"

In various embodiments, change information 468 refers to a set of key-value pairs that refer to changes associated with the event. In various embodiments, change information 468 comprises a user-defined key 470 and a corresponding user-defined value 472. In various embodiments, change information 468 can include a list of several key-value pairs. In various embodiments, user-defined value 472 refers to attributes not prefixed with underscores that are fields that replace those from the previous event's state. In some embodiments, when values are arrays or objects, the value will be a patch/diff of the changes in the array or object structure.

FIG. 5 shows an illustrative example of a process 500 for dynamically generating versioned data (e.g., file, object, document), in accordance with one or more example embodiments of the present disclosure. In at least one embodiment, some or all of the process 500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 500 may be implemented in the context of various systems and methods described elsewhere in this disclosure, such as those discussed in connection with FIG. 1, FIG. 2, FIG. 3, FIG. 4A, FIG. 4B, and FIG. 6. In at least one embodiment, process 500 or a portion thereof is implemented by an object oriented versioning and management system of a computing resource service provider.

In various embodiments, process 500 comprises a step 502 to determine a first event associated with a first binder at time T1, wherein the first event encodes a first set of elements. In various embodiments, the first binder and first template are represented in a directory tree structure. The first binder may be associated with a parent binder that includes sub-directories or sub-folders with further binders and/or templates associated with child binders, grandchild binders, and so on and so forth. In various embodiment, the first event is obtained by an object oriented versioning and management system from an event stream, such as those described in connection with FIG. 1.

In various embodiments, process 500 comprises a step 504 to determine a second event associated with a second binder at time T2, wherein the second event encodes a second set of elements. In some embodiments, T2 is later in time than T1. In various embodiments, the second binder and second template are represented in a directory tree structure. The second binder may be associated with a child binder that is included as a sub-directories or sub-folders with further binders and/or templates associated with parent binders, grandparent binders, and so on and so forth. In various embodiment, the first event is obtained by an object oriented versioning and management system from an event stream, such as those described in connection with FIG. 1.

In various embodiments, process 500 comprises a step 506 to determine a request to generate (e.g., render) a version of a data object at time T3. In various embodiments, T3 is a time that is subsequent to both T1 and T2 of the first and second events above. In various embodiments, a request to render a data object is received at an API endpoint from an end user, for example, as described in connection with FIG. 1. In some embodiments, the request will include an identifier (e.g., a URI) that encodes a location path associated with the data object.

In various embodiments, process 500 comprises a step 508 to determine a hierarchal relationship between the first binder and the second binder. In various embodiments, the hierarchal relationship is encoded within a URI. For example, a URI may encode that the path of the data object is a sub-directory or sub-path within a folder or path of the first binder, indicating that the first binder is a parent binder and that the second binder is a child binder.

In various embodiments, process 500 comprises a step 510 to determine, based at least in part on the first event, a first state. In various embodiments, the hierarchal relationship is utilized by an object oriented versioning and management system to inherit various elements form the first binder, such as templates, attributes, forms, etc. In some cases, a reducer is initiated with a default state that arises from a parent binder.

In various embodiments, process 500 comprises a step 512 to determine, based at least in part on the first state and the second event, a second state. In various embodiments, the reducer starts with an initialized state (e.g., this could be the first state of step 510 or another preceding state) and the reducer is invoked with each event from an event source to produce an updated state. In various embodiments, the updates can be from a parent or a child, for example, as discussed in connection with FIG. 4A.

In various embodiments, process 500 comprises a step 514 to generate the desired version of the data object according to the second state. In various embodiments, state updates are applied based on all events in the event stream that are relevant to the second binder-including events on the second binder itself or published to a parent up to the desired point in time.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

FIG. 6 illustrates a block diagram of an example of a machine 600 (e.g., implemented in whole or in part in the context of embodiments described in connection with other figures. In some embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include any combination of the illustrated components. For example, the machine 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (e.g., drive unit) 616, a signal generation device 618, and a network interface device/transceiver 620 coupled to antenna(s) 630. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

In various embodiments, object oriented versioning and management subsystem 636 refers to hardware, software, or a combination thereof that implements various functionality for versioning and managing data (e.g., file, object, document), for example, as described in connection with FIGS. 1-5. In various embodiments, one or more of the services, systems, or subsystems described in connection with FIG. 1 is collectively implemented by a fleet of machines (e.g., including machine 600).

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Articles such as "a" or "an" should generally be interpreted to include one or more described items, unless otherwise explicitly stated or contradicted by context. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Unless explicitly stated or otherwise contradicted by context, when a process is collectively performed by two or more systems, the systems involved in performing the process are not each required to be individually capable of performing all process steps. For example, if a method recites steps {A, B, C} that is collectively performed by a set of devices, a first device can comprise first memory storing instructions to perform {A} but not {B, C}, a second device can comprise second memory storing instructions to perform {B} but not {A, C}, and a third device can comprise third memory storing instructions to perform {C} but not {A, B}. Likewise, if multiple processors of a system are configured to collectively perform a process, one processor can be configured to perform one step of the process while another processor is configured to perform another step of the process.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Additionally, features of various system and methods described herein that are implemented "by" or "based on" performing a step are to be construed or may be synonymous to "by at least" or "based at least in part on" performing said step rather than "by solely" or "based solely on" performing said step, unless it is explicitly stated or clear from the context. For example, a system that implements specific features "by" performing a particular step may be described in a manner that is not exclusive of the performance of other steps, some of which may be related to said particular step. In some cases, other steps may be omitted from various discussions for the sake of clarity.

What is claimed is:

1. A computer-implemented method, comprising:
determining, by one or more processors of a computer system, a first event associated with a first template of a parent binder;
providing, by the one or more processors of the computer system, the first event to an event stream;
determining, by the one or more processors of the computer system, a second event associated with a first set of attributes of the parent binder;
providing, by the one or more processors of the computer system, the second event to the event stream;
determining, by the one or more processors of the computer system, a third event associated with a second template of a child binder, wherein an inheritance hierarchy encodes a parent-child relationship between the parent binder and the child binder;
providing, by the one or more processors of the computer system, the third event to the event stream;
generating, by the one or more processors of the computer system, a parent data object based at least in part on the first event and the second event; and
generating, by the one or more processors of the computer system, a child data object based at least in part on the second event and the third event.

2. The computer-implemented method of claim 1, wherein the event stream is an immutable, append-only event stream.

3. The computer-implemented method of claim 1, wherein the second template overrides at least a portion of the first template.

4. A system, comprising:
one or more processors; and
memory storing executable instructions that, as a result of execution by the one or more processors, cause the system to:
determine a first event associated with a first binder, wherein the first event encodes a first set of elements;
determine a second event associated with a second binder, wherein the second event encodes a second set of elements; and
determine a version of a data object by at least:
determining a hierarchal relationship between the first binder and the second binder;
determining, based at least in part on the first event, a first state;
determining, based at least in part on the first state and the second event, a second state; and
generating the version of the data object according to the second state.

5. The system of claim 4, wherein the executable instructions include further instructions that, as a result of execution by the one or more processors, further cause the system to:
obtain the first event from an immutable, append-only event stream, wherein the first event encodes a first time; and
obtain the second event from the immutable, append-only event stream, wherein the second event encodes a second time that is later than the first time.

6. The system of claim 4, wherein the executable instructions include further instructions that, as a result of execution by the one or more processors, further cause the system to:
determine a third event associated with the first binder, wherein the third event is a publish event;
determine a first time associated with the third event; and
determine a second time associated with the version of the data object, wherein the second time is after the first time.

7. The system of claim 4, wherein the first set of elements comprises:
a template or portion thereof;
an attribute;
a schema; and/or
a form.

8. The system of claim 4, wherein:
the second set of elements comprises at least one element that overrides a corresponding element of the first set of elements.

9. The system of claim 4, wherein the executable instructions include further instructions that, as a result of execution by the one or more processors, further cause the system to:
determine a third event associated with the second binder, wherein the third event encodes a third set of elements; and
determine a second version of the data object by at least:
determining, based at least in part on the second state and the third event, a third state; and
generating the second version of the data object according to the third state.

10. The system of claim 4, wherein the hierarchal relationship is encoded as a universal resource identifier (URI).

11. The system of claim 10, wherein:

a first portion of the URI encodes that the first binder is a parent binder; and a second portion of the URI encodes that the second binder is a child binder.

12. A non-transitory computer-readable storage medium storing executable instructions that, as a result of being executed by one or more processors of a computer system, cause the computer system to at least:

determine a first event associated with a first binder, wherein the first event encodes a first set of elements;

determine a second event associated with a second binder, wherein the second event encodes a second set of elements; and determine a version of a data object by at least:

determining a hierarchal relationship between the first binder and the second binder;

determining, based at least in part on the first event, a first state;

determining, based at least in part on the first state and the second event, a second state; and generating the version of the data object according to the second state.

13. The non-transitory computer-readable storage medium of claim 12, wherein the executable instructions include further instructions that, as a result of execution by the one or more processors, further cause the computer system to:

obtain the first event from an immutable, append-only event stream, wherein the first event encodes a first time; and obtain the second event from the immutable, append-only event stream, wherein the second event encodes a second time that is later than the first time.

14. The non-transitory computer-readable storage medium of claim 12, wherein the executable instructions include further instructions that, as a result of execution by the one or more processors, further cause the system to:

determine a third event associated with the first binder, wherein the third event is a publish event;

determine a first time associated with the third event; and determine a second time associated with the version of the data object, wherein the second time is after the first time.

15. The non-transitory computer-readable storage medium of claim 12, wherein the first set of elements comprises:

a template or portion thereof;

an attribute;

a schema; and/or a form.

16. The non-transitory computer-readable storage medium of claim 12, wherein:

the second set of elements comprises at least one element that overrides a corresponding element of the first set of elements.

17. The non-transitory computer-readable storage medium of claim 12, wherein the executable instructions include further instructions that, as a result of execution by the one or more processors, further cause the computer system to:

determine a third event associated with the second binder, wherein the third event encodes a third set of elements; and determine a second version of the data object by at least:

determining, based at least in part on the second state and the third event, a third state; and generating the second version of the data object according to the third state.

18. The non-transitory computer-readable storage medium of claim 12, wherein the hierarchal relationship is encoded as a universal resource identifier (URI).

19. The non-transitory computer-readable storage medium of claim 12, wherein:

a first portion of the URI encodes that the first binder is a parent binder; and a second portion of the URI encodes that the second binder is a child binder.

* * * * *